United States Patent [19]

Johnston

[11] Patent Number: 5,546,528
[45] Date of Patent: Aug. 13, 1996

[54] METHOD OF DISPLAYING MULTIPLE SETS OF INFORMATION IN THE SAME AREA OF A COMPUTER SCREEN

[75] Inventor: Kevin R. Johnston, Mountain View, Calif.

[73] Assignee: Adobe Systems Incorporated, Mountain View, Calif.

[21] Appl. No.: 265,653

[22] Filed: Jun. 23, 1994

[51] Int. Cl.$^6$ ..................................................... G06F 3/00
[52] U.S. Cl. ........................... 395/159; 395/156; 395/158
[58] Field of Search ........................... 395/155–161; 345/117–120, 146, 902

[56] References Cited

U.S. PATENT DOCUMENTS

| | | | |
|---|---|---|---|
| 5,060,135 | 10/1991 | Levine et al. | 395/161 X |
| 5,140,678 | 8/1992 | Torres | 395/159 |
| 5,157,763 | 10/1992 | Peter et al. | 395/157 |
| 5,283,864 | 2/1994 | Knowlton | 395/158 |
| 5,305,435 | 4/1994 | Bronson | 395/159 |
| 5,341,293 | 8/1994 | Vertelney et al. | 395/159 |
| 5,392,387 | 2/1995 | Fitzpatrick | 395/156 |
| 5,416,895 | 5/1995 | Anderson et al. | 395/158 |
| 5,438,662 | 8/1995 | Randall | 395/161 |
| 5,442,795 | 8/1995 | Levine et al. | 395/159 X |

*Primary Examiner*—Mark R. Powell
*Assistant Examiner*—John E. Breene
*Attorney, Agent, or Firm*—Roger S. Borovoy

[57] ABSTRACT

A method for displaying on a computer screen multiple sets of information needed on a recurring basis, comprising the steps of: (1) Establishing an area on the computer screen in which the multiple sets of information are to be displayed, the established area having a maximum size which is substantially less than the entire area of the screen. (2) Providing within the established area a plurality of selection indicators, one for each of the multiple sets of information. (3) Selecting one of the multiple sets of information for display within the established area by pointing to one of the selection indicators within the established area, whereby the selected set of information will be substituted within the established area for the set of information previously being displayed therein. A selected set of information may also be moved out of the selected area by pointing to its selection indicator and dragging it away.

8 Claims, 5 Drawing Sheets

METHOD OF DISPLAYING MULTIPLE SETS OF INFORMATION IN THE SAME AREA OF A COMPUTER SCREEN

BACKGROUND OF THE INVENTION AND PRIOR ART

As software programs become more complex, one of the biggest issues that program designers face is making all of a software program's controls easily accessible to users within a user interface. Most software products act on a central depository called a document, whose content a user creates and edits. A document is typically displayed in a rectangular region of the display screen called a document window. A spreadsheet user arranges numbers and titles in a spreadsheet document which acts like a 2-dimensional table. A word-processing user edits a document which is designed to visually mimic a sheet of paper. An image software user works on a document which looks like a photograph.

To create and perform actions on these documents, programmers have used a variety of user interface elements such as menus, dialog boxes and floating palettes. Pull-down menus, such as the one shown in FIG. 1, are typically lists of commands which can be hidden and activated or pulled down with a pointing or cursor control device, such as a "mouse" or trackball, or a keyboard command. In the example of FIG. 1, a click on command word "View" 1 in the menu at the top of the screen will cause the pull-down menu 2 to appear. These single-word commands take up very little screen real estate because the pull-down menu, in its collapsed state, has a very compact form, such as a single command word.

Dialog boxes, such as the one shown in FIG. 2, are interface elements that are typically composed of rectangular regions that appear outside of the document window. While a dialog box is active, action within the document is usually halted while the user is requested to select one or more of a number of options identified within the dialog box. The dialog box is then dismissed and disappears, and the document is updated based upon the selection which the user made from the dialog box.

Floating palettes (or simply "palettes"), unlike dialog boxes, are typically rectangular regions that "float" above or near the document window or even inside it and contain commands or tools which are used in an interactive fashion. As opposed to dialog boxes, floating palettes are "non-modal". This means that, unlike dialog boxes, actions occurring within the document are not halted while the palettes are being accessed by the user. Accordingly, floating palettes are most useful for holding tools and commands that a user needs to access interactively in tandem with the document itself. In the example of Adobe Photoshop™, floating palettes are used to select colors, document layers or tools, among other things.

As software becomes more complex, the number of possible actions and commands within each program rapidly multiplies. Menus become larger and longer; dialog boxes proliferate; and the number of required floating palettes grows. Thus, one of the most important tasks of the software creator is to manage the growing complexity of a program's user interface. The objective is to make all of a program's capabilities easily accessible and understandable, yet keep as much as possible of the document itself fully accessible and visible. This requires the minimization of the screen real estate used for the user interface elements discussed above, particularly those which remain on the screen for long periods.

In the screen example shown in FIG. 3 from the Microsoft Excel™ program, five of the nine possible floating palettes 3, 4, 5, 6 and 7, which Excel terms "toolbars", have been made accessible. Each of the icons (pictorial representations of commands) situated in these named palettes "Utility", "Macro", "Drawing", "Formatting" and "Chart", executes an Excel command when accessed by the mouse. Note, however, that these five palettes obscure a great deal of the document window, making it more difficult for the user to view and manipulate data within the document. This illustrates the problem of making commands easily accessible while maintaining as much as possible of the document accessible at the same time.

There are several ways that software engineers have tried to resolve these conflicting goals. The most basic way is to switch the floating palettes from visible to invisible when specific menu commands are chosen. For example, Adobe Photoshop has commands that enable a user to selectively hide or show the "Colors" palette.

Microsoft Excel, as shown in FIG. 3, implements two other popular schemes. In the case of the "Macro" palette 4, for example, movement of the tiny box 8 in the lower right hand corner allows the palette to be reoriented. As shown in FIG. 4, the "Macro" palette can be oriented either vertically or horizontally.

The second mechanism that Excel employs allows users to create custom palettes which contain the user's own private selection of command icons. Each of the icons on these palettes symbolizes and activates a selected Excel command. In this fashion, a user can customize the program so the commands that are used most often can be made the most accessible.

As will be apparent, all of these solutions solve part of the problem. However, as the number and variety of desirable floating palettes grow, additional real estate saving techniques must be invented.

BRIEF DESCRIPTION OF THE INVENTION

The method of this invention can work in conjunction with the prior art techniques, described above, providing still more savings in screen real estate when floating palettes are employed. Briefly, the method of this invention for displaying on a computer screen multiple sets of information needed on a recurring basis comprises the following steps: (1) establishing an area on the computer screen in which the multiple sets of information are to be displayed, the area having a maximum size which is substantially less than the entire area of the screen; (2) providing within that area a plurality of selection indicators, one for each of the multiple sets of information; and (3) selecting one of the multiple sets of information for display within the established area by pointing to one of the selection indicators within the established area, whereby the selected set of information will be substituted within the same area for the set of information which previously had been displayed within the established area. When the user no longer wants the sets of information to be combined, he or she may point to one of the selection indicators within the selected area and move or drag one of the selected sets of information away from the established area.

Using the method of this invention, the same screen area can be used for these multiple sets of information, thereby freeing up more area of the document for user access.

3

Alternatively, this space saving technique can be employed to make available more floating palettes than were previously possible with prior art techniques.

DETAILED DESCRIPTION OF THE PREFERRED EMBODIMENT

Figure 1:
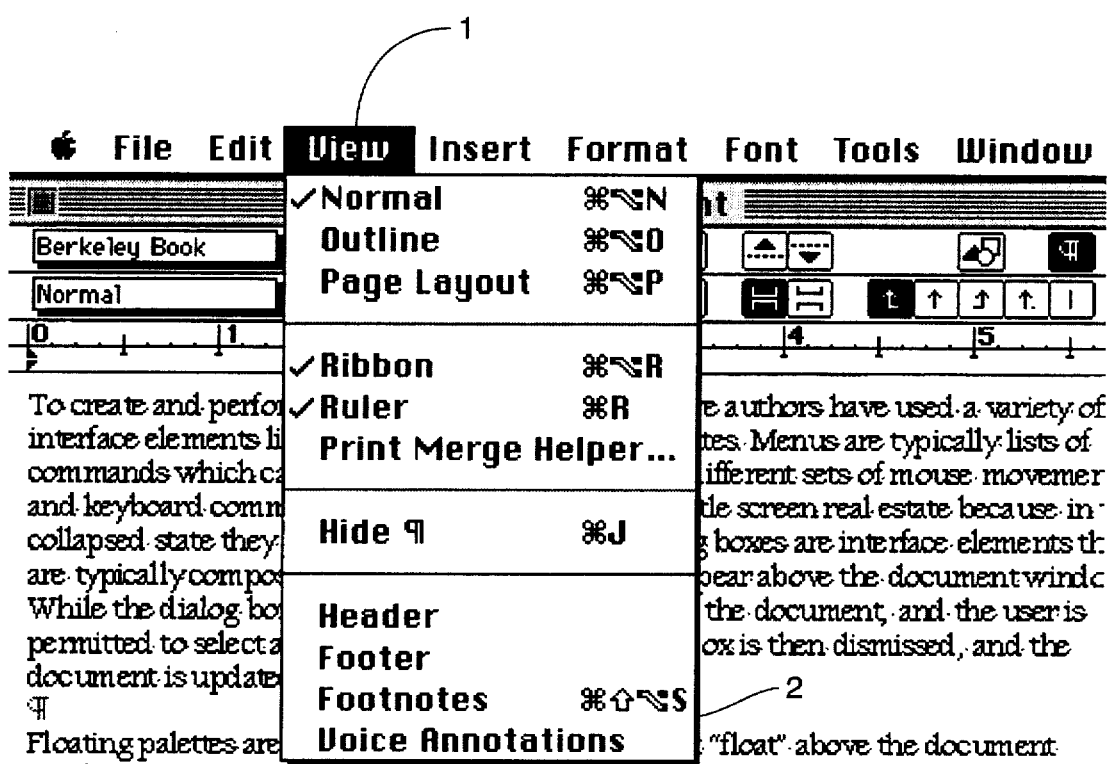
FIG. 1 illustrates the use of pull-down menus in a computer program.
Figure 2:
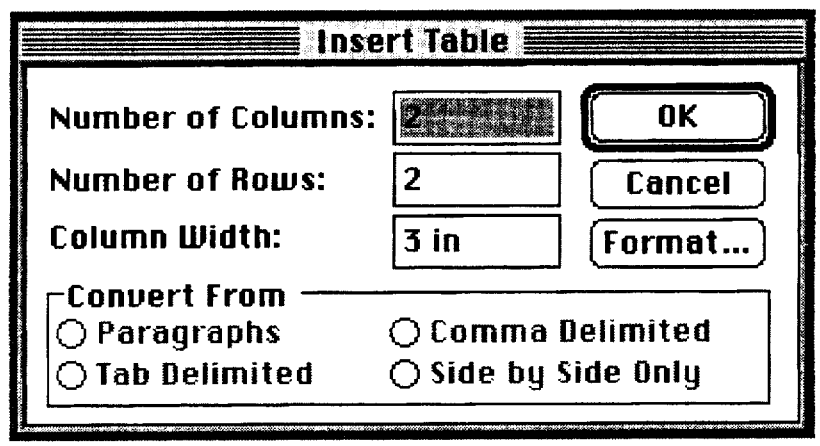
FIG. 2 illustrates a typical dialog box in a computer program.
Figure 3:
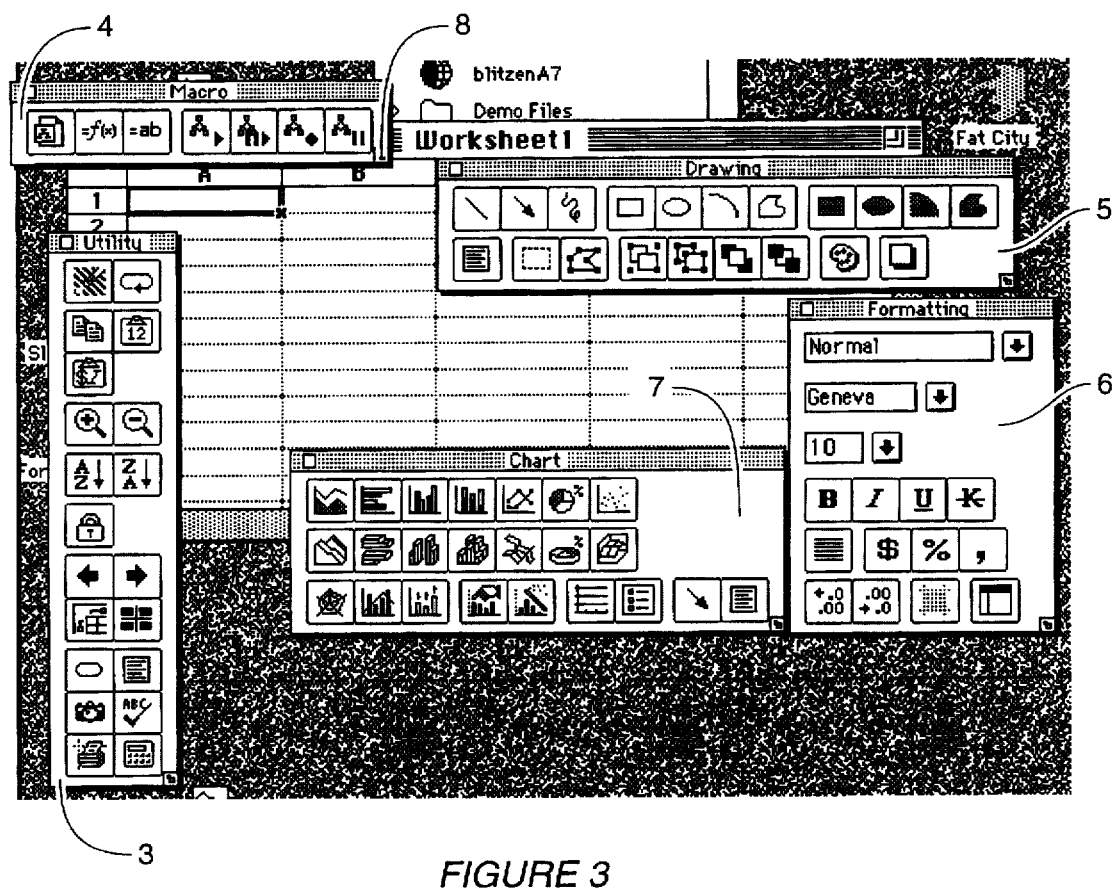
FIG. 3 illustrates the use of floating palettes in a computer program.
Figure 4:
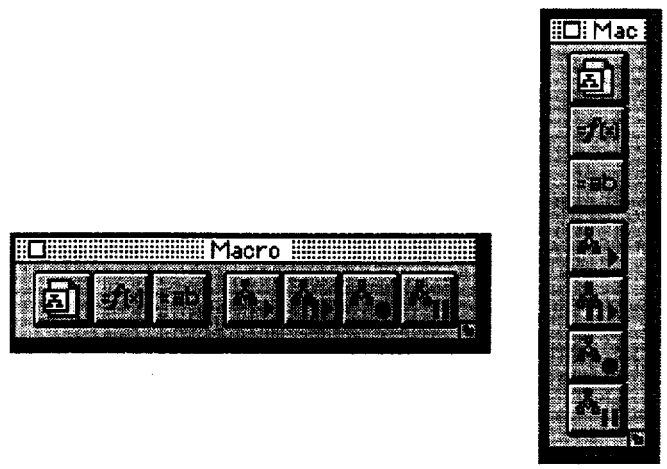
FIG. 4 illustrates the use of re-orientable palettes in a computer program.
Figure 5:
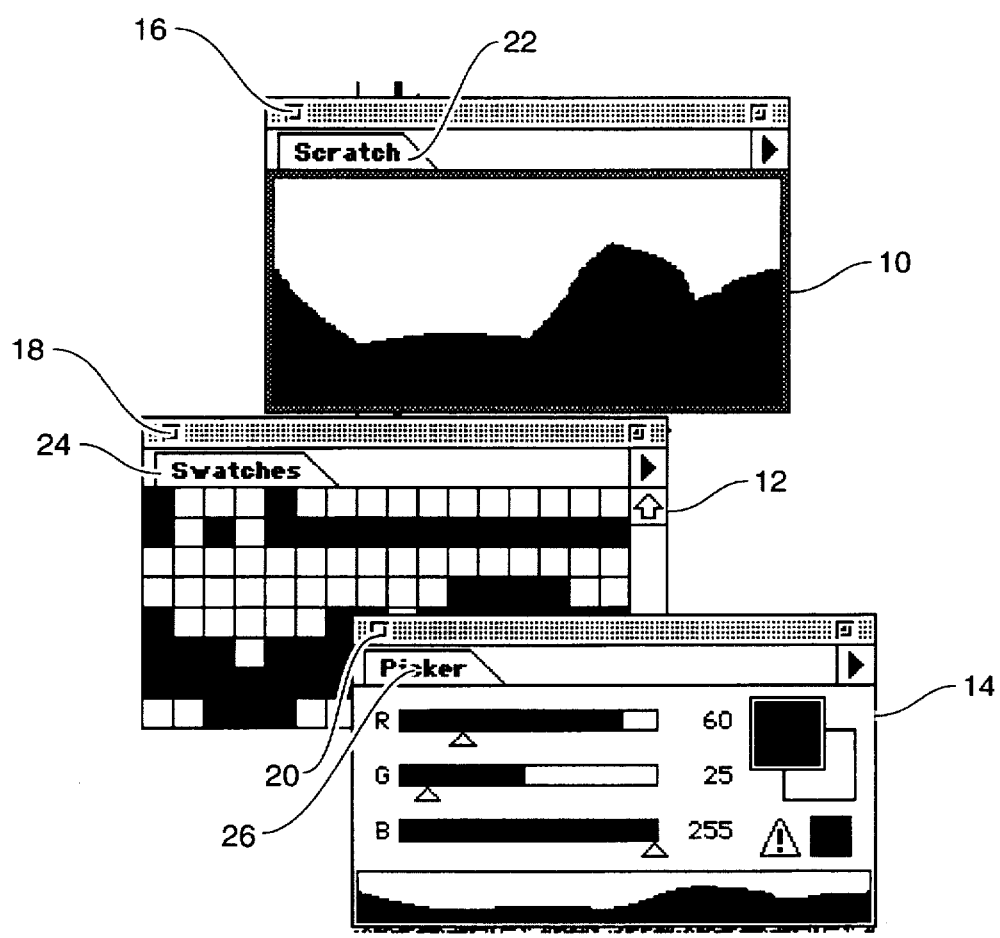
FIG. 5 shows an arrangement of floating palettes of the invention with one palette overlapping another.

The invention works with floating palettes that may be used in accordance with prior art techniques. For example, the "Scratch", "Swatches" and "Picker" palettes, shown in FIG. 5 as palettes 10, 12 and 14, respectively, are three different sets of controls used for selecting colors in the Adobe Photoshop program. As with typical prior art floating palettes, they can be moved anywhere on the screen. They can be overlapped, as is shown in FIG. 5, where "Picker" palette 14 is partially overlapped onto "Swatch" palette 12. And they can be hidden by clicking on the "close boxes" 16, 18 and 20, respectively located in the upper left corner of each of the three palettes 10, 12 and 14 in FIG. 5. Once hidden, a palette is re-activated, as is well known in the art, by choosing an appropriate menu command which designates the hidden palette. As with normal Macintosh® software, clicking on any of boxes 16, 18 or 20 totally removes the palette containing that box from the screen. In accordance with this invention, any hidden palettes underneath the top one would also be removed.

The technique of the invention departs from prior art solutions to the screen real estate saving problem by allowing multiple palettes to be combined so that they occupy the same screen real estate and move as a combined unit. In accordance with the invention, by clicking on the title control tabs 22, 24 or 26 of one of palettes 10, 12 or 14, respectively, shown as folder tabs entitled "Scratch", "Swatches" and "Picker" just under the top left corner of each of these palettes 10, 12 and 14, a particular palette is selected. For example, in FIG. 6, if "Scratch" palette 10 is selected (by clicking on the "Scratch" tab) and dragged to the left so as to partially overlap the "Swatches" palette 12, as shown by the dotted box 11 in FIG. 6, instead of the palettes remaining partially overlapped, as shown by the dotted box 11 in FIG. 6, they will be physically combined in area 40, as shown in FIG. 7.

Figure 7:
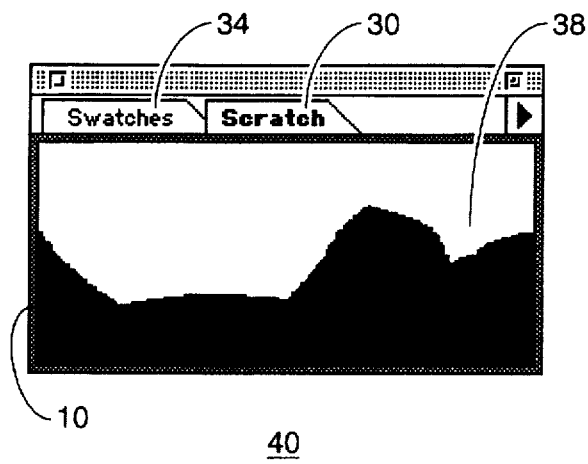
FIGS. 7 and 8 show two examples of combined floating palettes in accordance with the invention.
Figure 8:
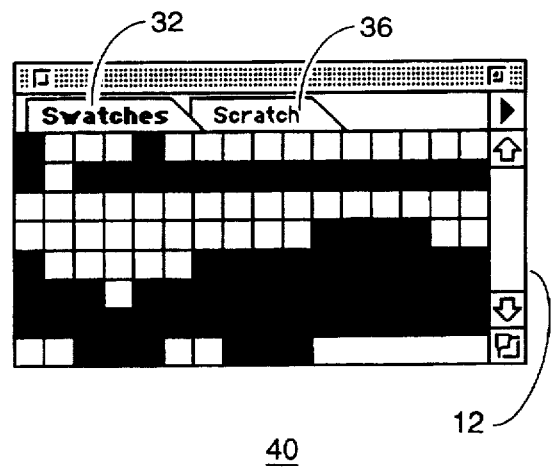

In their combined state, shown as screen area 40 in both FIGS. 7 and 8, the "Scratch" and "Swatches" palettes 10 and 12 move as one and occupy the exact same physical screen space 40 as a single palette. Screen area 40 in FIG. 7 shows the "Scratch" palette 10 selected and visible, the "Swatches"

4 palette 12 being hidden behind it with only its control tab 34 visible. The same screen area 40 in FIG. 8 shows the "Scratch" palette 10 hidden with only its control tab 36 visible and the "Swatches" palette 12 is selected and fully visible. It is important to note that the tab controls of both palettes always remain accessible, as shown. When combined, the palette control tabs of the two unified palettes assume one of two states: active, as shown by "Scratch" tab 30 in FIG. 7 and "Swatches" tab 32 in FIG. 8, or inactive, as shown by "Swatches" tab 34 in FIG. 7 and "Scratch" tab 36 in FIG. 8. Only the active palette is displayed, not the inactive one. Clicking on an inactive palette control tab, which always remains displayed, makes that palette the active one, and makes the formerly active palette inactive. By clicking on tab 34 in screen area 40 in FIG. 7, for example, the inactive "Swatches" palette 12 will replace the active and visible "Scratch" palette 10 as the palette in view, as shown in screen area 40 in FIG. 8.

Figure 6:
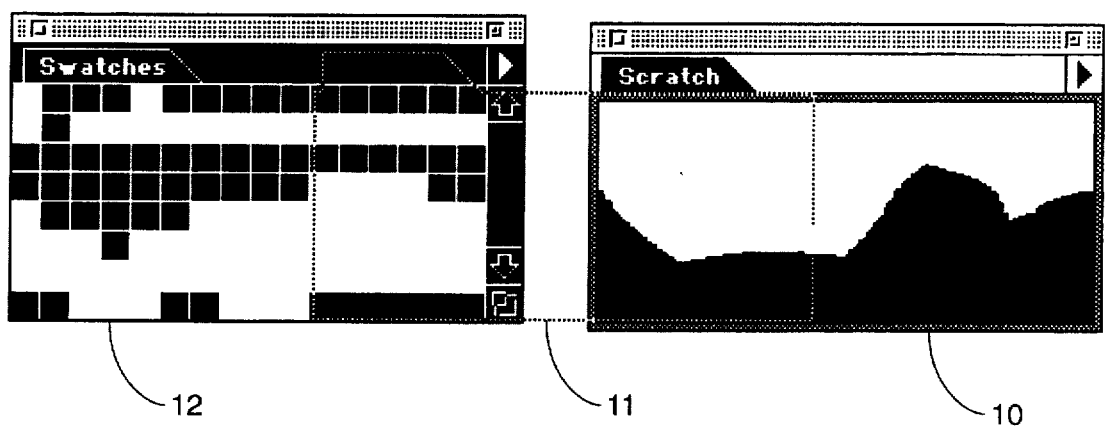
FIG. 6 shows two separate combinable palettes of the type used in the invention before they are combined.

Virtually any number of palettes can be combined, one behind the other, by this same technique, not just two. The only requisite is that the tabs of the hidden palettes always be visible so an inactive palette can be identified and retrieved. Combined palettes may easily be separated by the same technique as used for combining them, as illustrated in FIG. 6. Clicking on the title control tab 34 in FIG. 7 of the inactive "Swatches" palette and dragging it outside of the combined screen area 40 will liberate the hidden "Swatches" palette 12 and place "Swatches" palette 12 in an area of the screen where it can be viewed.

Figure 9:
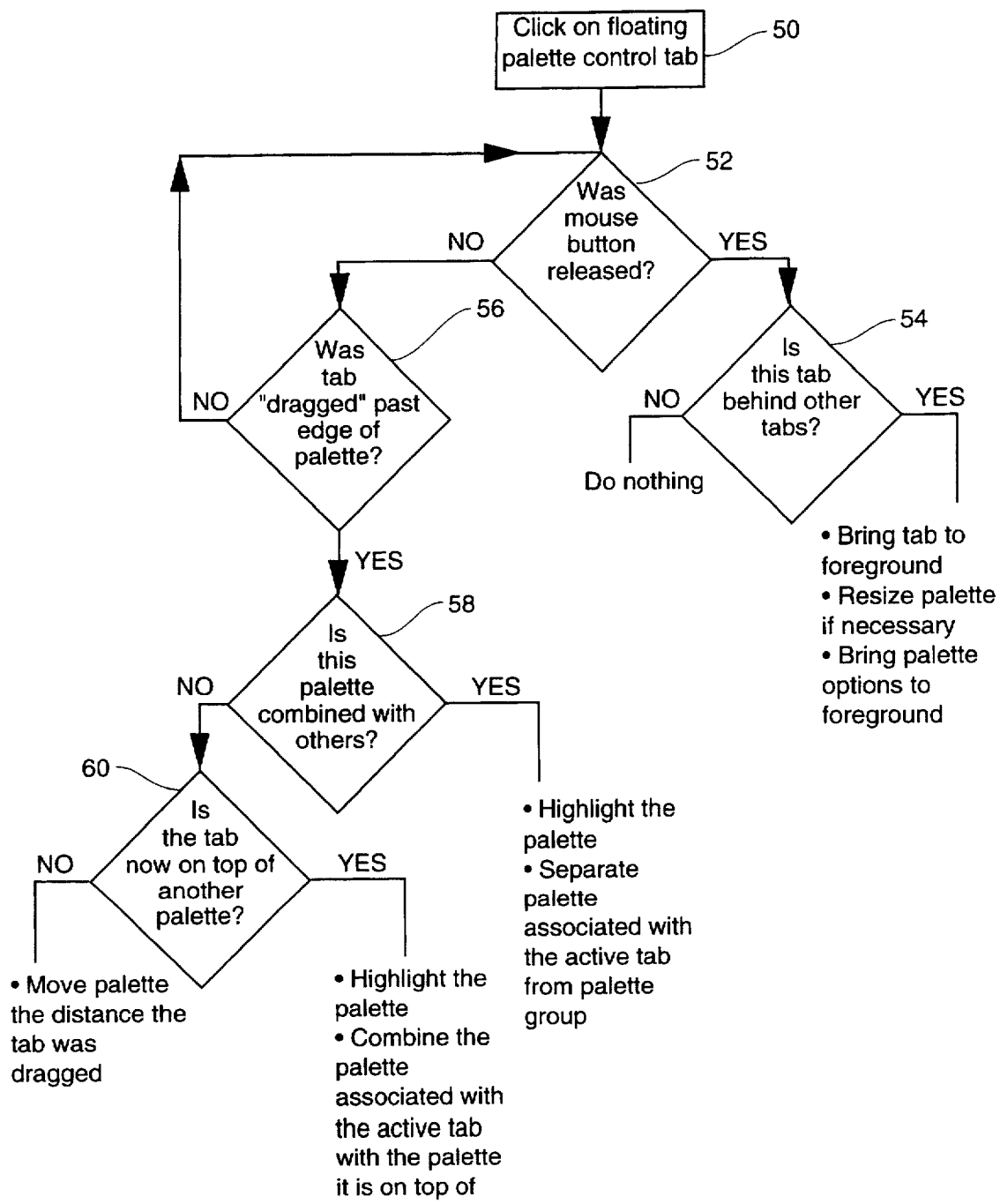
FIG. 9 illustrates the control flow for the combinable palettes of a preferred embodiment of the invention.

The method of the invention is described in more detail using the flow chart of FIG. 9. The method starts at box 50 where the user clicks the pointer on the floating palette control tab. At step 52 a determination is made whether the mouse button has been released. If the answer is yes, a second determination is made at step 54 as to whether the selected palette control tab was behind other tabs. The tab will be "behind" other tabs when it belongs to an inactive palette which is combined with an active palette. If the answer to that question is yes, the selected tab is made active, the other tabs with which it is combined are made inactive and its palette contents are made visible. If desired, the palette indicated by the selected tab also may be resized, as is well known in the art, for example, in Microsoft "Windows". The palette options are brought to the foreground at the same time. On the other hand, if the selected tab was determined at step 54 not to be combined with other tabs, or is already active, then nothing further need be done.

If it was determined at step 52 that the mouse button had not been released, a determination is made at step 56 whether the selected tab was dragged past the edge of the screen area of the palette controlled by the selected tab (such as screen area 40 in FIGS. 7 and 8). If not, nothing further is done. If so, however, at step 58 a determination is made whether the selected palette is currently combined with any others. If so, the selected palette is highlighted. Moreover, the palette associated with the selected tab is separated from the inactive palettes in the selected palette group.

If the selected palette was determined in step 58 not to be combined with any others, then a determination is made at step 60 whether the tab is now on top of another palette. If so, the palette which the selected tab is on top of is highlighted. In addition, the palette associated with the selected tab is combined with the palette that it is on top of. If the determination in step 60 finds that the tab is not now on top of another palette, the selected palette is merely moved the distance that the tab was dragged, as was determined at step 56.

The technique of the invention provides a way of combining palette controls to allow multiple sets of controls to occupy the same screen space. The invention allows any number of palettes to be combined or separated at the user's discretion.

A general description of the device and method of the present invention as well as a preferred embodiment of the present invention has been set forth above. For example, the palettes could be somewhat different from each other in area, and a smaller one may be placed on top of a larger one (or vice-versa), where either the smaller one would expand to fill the space of the larger, or the larger one shrink to conform to the smaller, taking into account any size limitations imposed upon one or more palettes by the underlying program. One skilled in the art will be able to practice variations in the methods described which fall within the scope of the teachings of this invention, which should only be limited as set forth in the claims which follow.

What is claimed is:

1. A method for combining on a computer display an additional set of information into a group of multiple sets of information needed on a recurring basis, comprising the steps of:

establishing an area on the computer display in which the group of multiple sets of information is to be displayed, the area having a size which is less than the entire area of the computer display;

providing within the area a plurality of selection indicators, one associated with a corresponding one of the multiple sets of information; and selecting a second of the multiple sets of information from the group for display within the area by activating a selection indicator associated with a corresponding one of the multiple sets of information, whereby the second of the multiple sets of information is substituted within the area of the display for the first set of information; and combining the additional set of information, displayed in a different area of the display from the established area, into the group of multiple Sets of information so that the additional sets of information may be selected in the same manner as the other sets of information in the group.

2. The method of claim 1 wherein the established area is movable to various display locations around the display.

3. The method of claim 1 wherein the additional set of information is combined by pointing to a selection indicator for the additional set of information and dragging that selection indicator into the established area.

4. The method of claim 1 wherein one of the multiple sets of information in the established area is moved away from the established area.

5. The method of claim 4 wherein the move is accomplished by activating to a selection indicator for the set of information to be moved and dragging that selection indicator away from the established area.

6. A method for removing a set of information from a group of multiple sets of information on a computer display, comprising the steps of:

establishing an area on the computer display in which the group of multiple sets of information is to be displayed, the area having a size which is less than the entire area of the computer display;

displaying within the area a first of the multiple sets of information from the group of multiple sets of information;

providing within the area a plurality of selection indicators, each being associated with one of the multiple sets of information:

selecting a second of the multiple sets of information from the group of multiple sets of information for displaying within the area by activating a selection indicator associate with the second of the multiple sets of information, whereby the second of the multiple sets of information is substituted on the display for the first of the multiple sets of information; and removing a set of information from the group of multiple sets of information and displaying that set of information in a different area of the display from the established area.

7. The method of claim 6 wherein the set of information is removed by pointing to the selection indicator associated with that set of information and dragging the set of information out of the established area.

8. The method of claim 6 wherein the established area is movable to another location on the display.

* * * * *

UNITED STATES PATENT AND TRADEMARK OFFICE
CERTIFICATE OF CORRECTION

PATENT NO. : 5,546,528
DATED : August 13, 1996
INVENTOR(S) : Kevin R. Johnston

It is certified that error appears in the above-indentified patent and that said Letters Patent is hereby corrected as shown below:

| COLUMN | LINE | |
|--------|------|---|
| 5 | 41 | change "Sets" to "sets". |
| 5 | 42 | change "sets" to "set". |
| 6 | 9 | after "activating" delete "to". |
| 6 | 30 | change "associate" to "associated". |

Signed and Sealed this

Seventh Day of January, 1997

Attest:

BRUCE LEHMAN

Attesting Officer     Commissioner of Patents and Trademarks